(12) United States Patent
Mashford

(10) Patent No.: US 6,401,596 B1
(45) Date of Patent: Jun. 11, 2002

(54) METALLIC CAP FOR MOLDED PLASTIC DISC BRAKE PISTONS

(75) Inventor: Michael Gene Mashford, Niagara Falls (CA)

(73) Assignee: Court Holdings Limited, St. Catharines (CA)

(*) Notice: Subject to any disclaimer, the term of this patent is extended or adjusted under 35 U.S.C. 154(b) by 0 days.

(21) Appl. No.: 09/653,657

(22) Filed: Sep. 1, 2000

(51) Int. Cl.[7] .................................................. F16J 9/00
(52) U.S. Cl. ..................................... 92/248; 188/264 G
(58) Field of Search .......................... 92/248, 222, 172; 264/273; 188/71.6, 264 G

(56) References Cited

U.S. PATENT DOCUMENTS

| 1,401,283 A | 12/1921 | Schumacher |
| 2,263,815 A | 11/1941 | Northup |
| 2,644,199 A | 7/1953 | Miller |
| 3,381,351 A | 5/1968 | Szwargulski |
| 3,490,099 A | 1/1970 | Smith |
| 4,106,658 A | 8/1978 | Brandon ................ 220/453 |
| 4,449,447 A | * 5/1984 | Yanagi ..................... 92/248 |
| 4,868,968 A | 9/1989 | Dixon ...................... 29/460 |
| 5,279,211 A | 1/1994 | Bentz ...................... 92/248 |
| 5,435,234 A | 7/1995 | Bentz ...................... 92/248 |
| 5,551,141 A | 9/1996 | De'Ath .................. 29/527.3 |
| 5,575,358 A | * 11/1996 | McCormick ............ 188/71.6 |
| 5,713,435 A | 2/1998 | Schneider ............... 188/71.6 |

FOREIGN PATENT DOCUMENTS

| CA | 1187424 | 5/1985 |
| CA | 1198379 | 12/1985 |
| CA | 1228963 | 11/1987 |

* cited by examiner

Primary Examiner—F. Daniel Lopez
Assistant Examiner—Thomas E. Lazo
(74) Attorney, Agent, or Firm—Norris, McLaughlin & Marcus

(57) ABSTRACT

A metallic cap for a plastic disc brake piston is provided with openings in a cylindrical side wall thereof and the plastic is caused to flow into the openings during molding of the piston to create an extension of the plastic material which locks the cap onto the piston. The cap has an end wall and at least one side wall and preferably has inner and outer side walls. The openings are generally in the form of holes or slots. At least one opening is required and at least two openings are preferred. The cap is integrally molded to the piston by placing the cap in the mold, adding resin material and causing molding of the resin material by heating and/or compression.

10 Claims, 3 Drawing Sheets

METALLIC CAP FOR MOLDED PLASTIC DISC BRAKE PISTONS

BACKGROUND OF THE INVENTION

1. Field of the Invention

The invention relates to plastic pistons which are commonly employed in disc brakes and, in particular, plastic pistons made with a metallic cap which protects the open end of the piston that comes into contact with the back face of the friction pad in a disc brake assembly. More specifically, the invention, has to do with an improvement in the metallic cap.

2. The Related Art

Plastic pistons have been employed in vehicular disc brake assemblies for several years. In some applications, a heat resistant ring or metallic cap is employed to protect the plastic from the heat generated during braking.

U.S. Pat. No. 4,449,447 describes a resinous disc brake piston having a heat resistant ring bonded thereto at the opening end thereof. In some embodiments, the rings are perforated for degassing in the process of molding the ring and the piston body.

Metallic caps which are attached by various anchoring means to the open end of the piston are described in Canadian Patents 1,187,424 and 1,198,379.

Canadian Patent 1,228,963 describes phenolic pistons having metallic caps integrally bonded thereon. These pistons are manufactured by placing a cap in a mold and then adding phenolic resinous material which is melted and compressed against the surface of the metallic cap so as to form a firm bond therewith. According to the patent, the bond between the resin body of the piston and the metallic cap can be improved by crimping the edges of the cap so that the edges are impregnated in the resin body. Other patents describing plastic pistons with integrally bonded caps having crimped edges are U.S. Pat. Nos. 5,575,358 and 5,713,435.

The present invention is directed to a new cap design which provides an improved bond between the resin body of the piston and the metallic cap without employing crimped edges on the side walls of the cap as described in the prior art. The invention also prevents or minimizes the undesirable flow of phenolic resin up the outside of the crimped side walls of the cap toward the open end of the piston. Furthermore, handling of the caps during manufacturing is facilitated by the invention because the side walls of the caps have circumferences which are not interrupted by crimped, tabbed or pronged edges. Accordingly, they can be picked up by robotic equipment from any position without being dropped prematurely and they are placed in the mold consistently in the correct position. Other advantages will be apparent to those skilled in the art.

SUMMARY OF THE INVENTION

A metallic cap for a plastic disc brake piston is provided with openings in a cylindrical side wall thereof. The plastic is caused to flow into the openings during molding of the piston and thereby create an extension of the plastic material which locks the cap onto the piston. The cap is comprised of an end wall and at least one side wall. In a preferred embodiment the cap has an end wall and inner and outer side walls. The openings are generally in the form of holes or slots and they are provided in either or both of the side walls. At least one opening is required and, preferably, at least two openings are employed opposite one another on the same side wall. The cap is integrally molded to the piston by placing the cap in the mold, adding resin material and causing molding of the resin material by heating and/or compression. During molding some of the resin flows into the openings making extensions of the resin material. This creates an interlock which firmly secures the cap to the piston.

DESCRIPTION OF THE PREFERRED EMBODIMENTS

Figure 1:
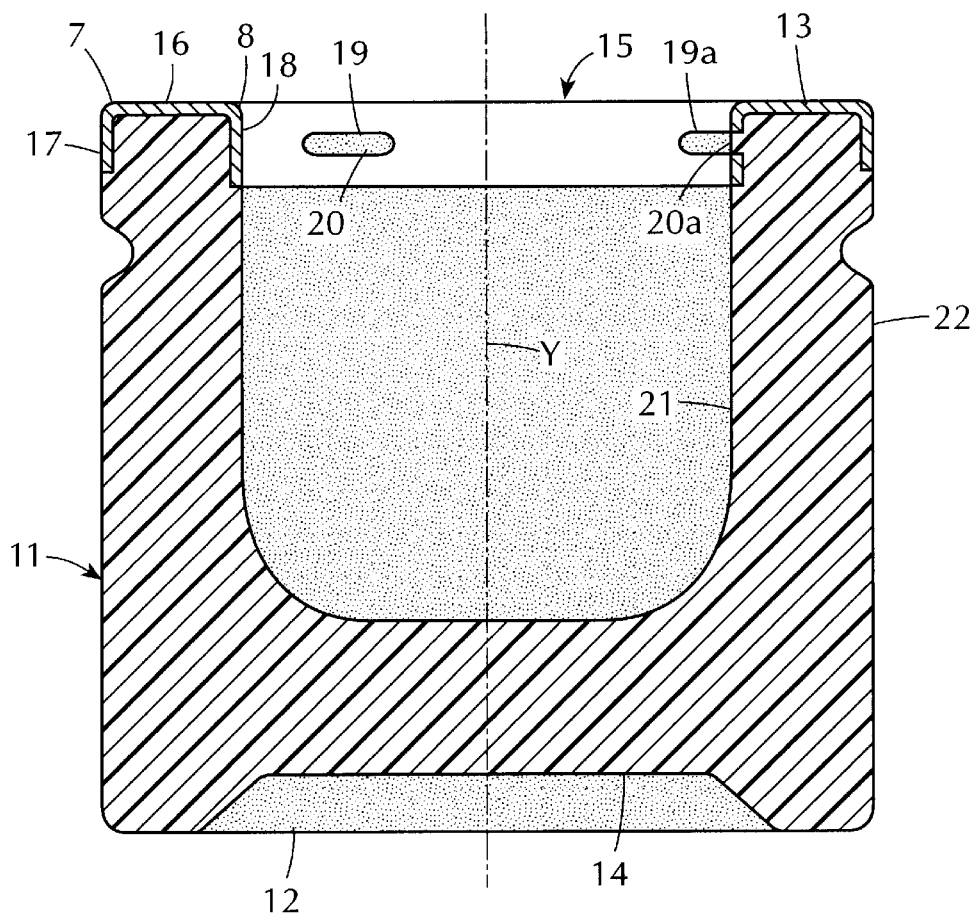
FIG. 1 is a sectional elevational view of a disc brake piston incorporating a cap of the invention.

Referring to FIG. 1, piston 11 is illustrated as a cylinder having a center axis Y, a closed end 12 and an opened end 13. The piston is comprised of a plastic material generally in the form of a synthetic resin and preferably a phenolic resin. The exterior surface 14 of closed end 12 is shown to be concave but it can have different configurations so long as there is a sufficient cavity to provide for a fluid reservoir behind the piston. Metallic cap 15 covers the end wall of open end 13. The cap 15 is comprised of end wall 16 having an outer edge 7 and an inner edge 8, outer side wall 17 extending from outer edge 7 and inner side wall 18 extending from inner edge 8. Openings in the form of slot 19 are provided in the inner side wall 18 and the slot 19a, which is in section, illustrates an extension 20a of the plastic material which was formed by causing the plastic material to flow into and fill the slot 19a during the molding process. The same type of extension 20 is illustrated in slot 19 and the inside surface of the extension is generally flush with the inside surface of inner wall 18, the inside surface being on the same side as the inner surface 21 of the inner wall of the piston (i.e., the closest side wall to axis Y). Reference numeral 22 designates the outer surface of the piston.

Figure 1A:
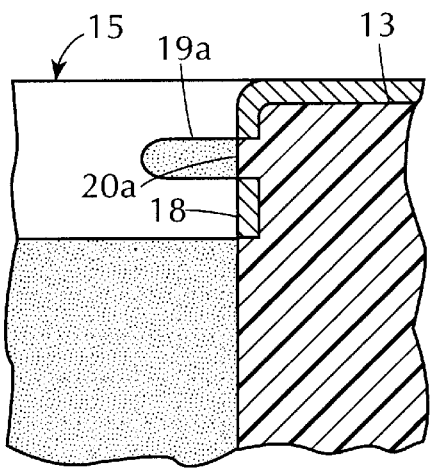
FIG. 1A is an expanded view of a portion of FIG. 1.

FIG. 1A is an expanded view of a portion of FIG. 1 which illustrates more clearly the extension 20a which is comprised of plastic which has flowed into and filled slot 19a of the cap 15. Inner wall 18 and open end 13 of the piston are also illustrated.

Figure 2:
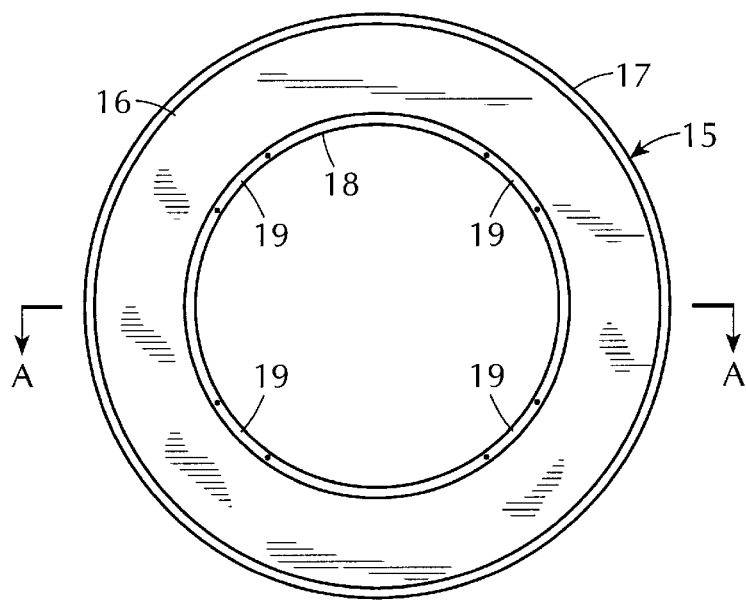
FIG. 2 is a bottom elevational view of the cap.

FIG. 2 is a bottom elevational view of the cap 15 (i.e., a view of the underside) illustrating outer wall 17 and inner wall 18 as said walls project away from end wall 16 and toward the eye of the reader. The locations of four slots 19 are identified as equidistant from one another around the inside wall 18 of the cap 15 and two of the slots 19 can be seen in FIG. 3.

FIGS. 3–6 illustrate various cap embodiments provided with various types of openings which can be employed according to the invention. Other variations within the scope of the invention will be apparent to those skilled in the art based upon the description set forth herein.

Figure 3:
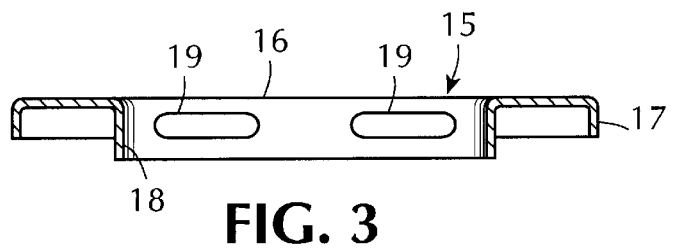
FIG. 3 is a sectional elevational view of the cap taken along line A—A of FIG. 2.

FIG. 3 is a sectional elevational view of the cap 15 taken along line A—A of FIG. 2. The openings of this cap are in the form of slots 19 and this is the same cap embodiment as is illustrated in relation to the piston 11 of FIG. 1.

Figure 4:
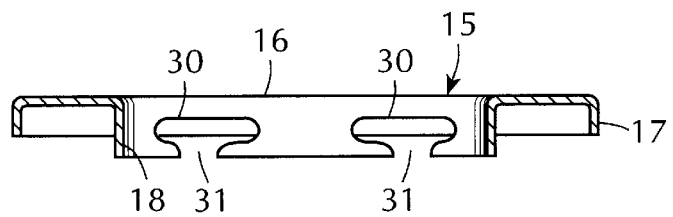
FIGS. 4–9 are sectional elevational views of other embodiments of a cap taken from the same perspective as FIG. 3.
Figure 7:
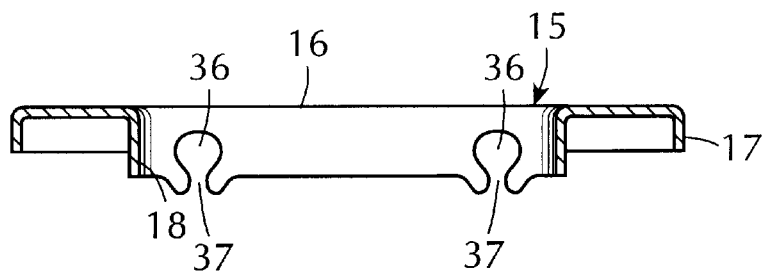
Figure 8:
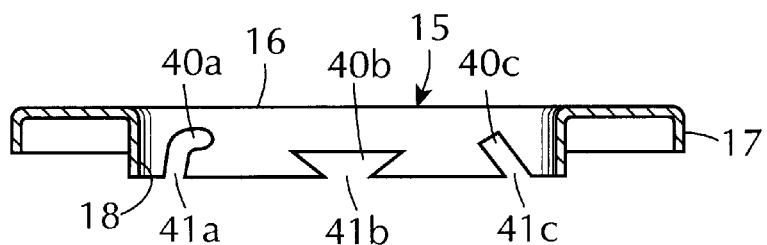

FIG. 4 illustrates a cap 15 having another type of opening 30 which includes cut outs 31 along the bottom edge of inner wall 18. This type of opening with cut outs in the bottom of the inner wall can have various types of geometric shapes as long as the shape of the opening above the cut out will prevent the cap from moving off the piston in a direction away from the closed end 14 and along the Y axis. The various geometric shapes that might be used to accomplish this purpose will be apparent to those skilled in the art and additional examples are illustrated in the partial elevational views of FIG. 7 and FIG. 8. In FIG. 7, oval openings 36 are illustrated with cut outs 37. This design can be made by punching holes in flat cap stock at locations which will become part of the side walls following extrusion to create the side walls. The extrusion process makes the round holes into an oval shape and creates the cut outs 37. FIG. 8 illustrates a variety of openings designated as 40a, b and c and cut outs as 41a, b and c. While it is possible to use differently shaped openings on the same cap, this figure is simply intended to illustrate a few variations on opening types which are within the scope of the invention.

Figure 5:
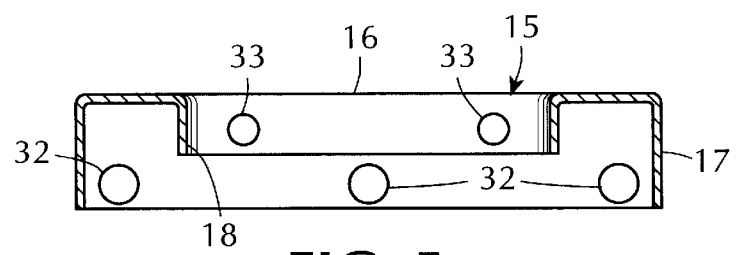

FIG. 5 illustrates a cap from the same perspective as FIG. 3 wherein openings in the form of holes 32 in the outer wall 17 of cap 15 are provided as well as openings in the form of holes 33 in the inner wall 18 of cap 15. This drawing is intended to illustrate that the openings can be both in the inner wall and the outer wall. Of course, the openings can be provided in the outer wall only (not illustrated) or in the inner wall only as illustrated in FIGS. 1, 3, 4 and 6.

Figure 6:
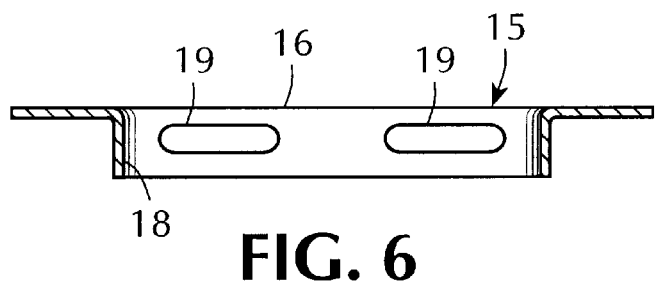

FIG. 6 illustrates another cap embodiment from the same perspective as FIG. 3 and in this embodiment the cap 15 has an end wall 16 and an inner wall 18 but no outer wall.

Figure 9:
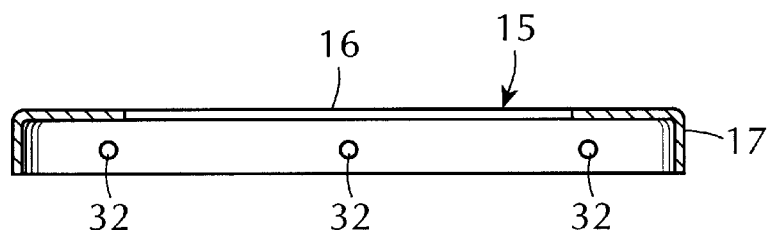

FIG. 9 illustrates another cap embodiment from the same perspective as FIG. 3 and in this embodiment the cap 15 has an end wall 16 and an outer wall 17 but no inner wall.

In the molding operation, the metallic cap 15 is placed in the mold first and then the resinous molding material, preferably in some particulate form or as a "pre-form" is placed in the mold adjacent to the underside surfaces of the metallic cap 15. Then the resinous molding material is melted and compressed against the underside surfaces of the metallic cap 15 so as to form a firm integral bond therewith and fill the openings with the resinous molding material. The portions of the resinous molding material which fill the openings become the extensions which lock the cap to the piston.

The metallic cap can be formed of various types of metals such as steel, aluminum, alloys and others as will be apparent to those skilled in the art. The cap can have a thickness from about 0.0005 to about 0.25 inch, preferably from about 0.005 to about 0.050 inch and most preferably from about 0.010 to about 0.20 inch.

What is claimed is:

1. A piston adapted for use in a brake assembly comprising:
   a hollow piston body formed from a phenolic resin, said piston body including an open end, a closed end, an inner surface extending between said open end and said closed end, and an outer surface extending between said open end and said closed end;
   a metal cap integrally molded in situ with said piston body, said cap including an end wall having an inner edge and an outer edge, an inner side wall extending from said inner edge, and an outer side wall extending from said outer edge, wherein said end wall of said cap covers said open end of said piston body, said inner side wall of said cap covers a portion of said inner surface of said piston body and said outer side wall of said cap covers a portion of said outer surface of said piston body; and
   at least one opening in at least one of the inner side wall or the outer side wall, said opening being filled with a portion of phenolic resin in the form of an extension of said resin into the side wall.

2. The piston of claim 1 having at least two openings.

3. The piston of claim 2 wherein said openings are spaced equidistant from one another around the inner side wall.

4. The piston of claim 2 wherein said openings are spaced equidistant from one another around the outer side wall.

5. A piston adapted for use in a brake assembly comprising:
   a hollow piston body formed from a phenolic resin, said piston body including an open end, a closed end, an inner surface extending between said open end and said closed end, and an outer surface extending between said open end and said closed end;
   a metal cap integrally molded in situ with said piston body, said cap including an end wall having an inner edge and an outer edge and an inner side wall extending from said inner edge, wherein said end wall of said cap covers said open end of said piston body and said inner side wall of said cap covers a portion of said inner surface of said piston body; and
   at least one opening in the inner side wall, said opening being filled with a portion of phenolic resin in the form of an extension of said resin into the inner side wall.

6. The piston of claim 5 having at least two openings.

7. The piston of claim 6 wherein said openings are spaced equidistant from one another around the inner side wall.

8. A piston adapted for use in a brake assembly comprising:
   a hollow piston body formed from a phenolic resin, said piston body including an open end, a closed end, an inner surface extending between said open end and said closed end, and an outer surface extending between said open end and said closed end;
   a metal cap integrally molded in situ with said piston body, said cap including an end wall having an inner edge and an outer edge and an outer side wall extending from said outer edge, wherein said end wall of said cap covers said open end of said piston body and said outer side wall of said cap covers a portion of said outer surface of said piston body; and
   at least one opening in the outer side wall, said opening being filled with a portion of phenolic resin in the form of an extension of said resin into the outer side wall.

9. The piston of claim 8 having at least two openings.

10. The piston of claim 9 wherein said openings are spaced equidistant from one another around the outer side wall.

* * * * *